Aug. 3, 1954
S. B. VAN ZEE
2,685,457
TRAILER HITCH
Filed May 21, 1952
2 Sheets-Sheet 1
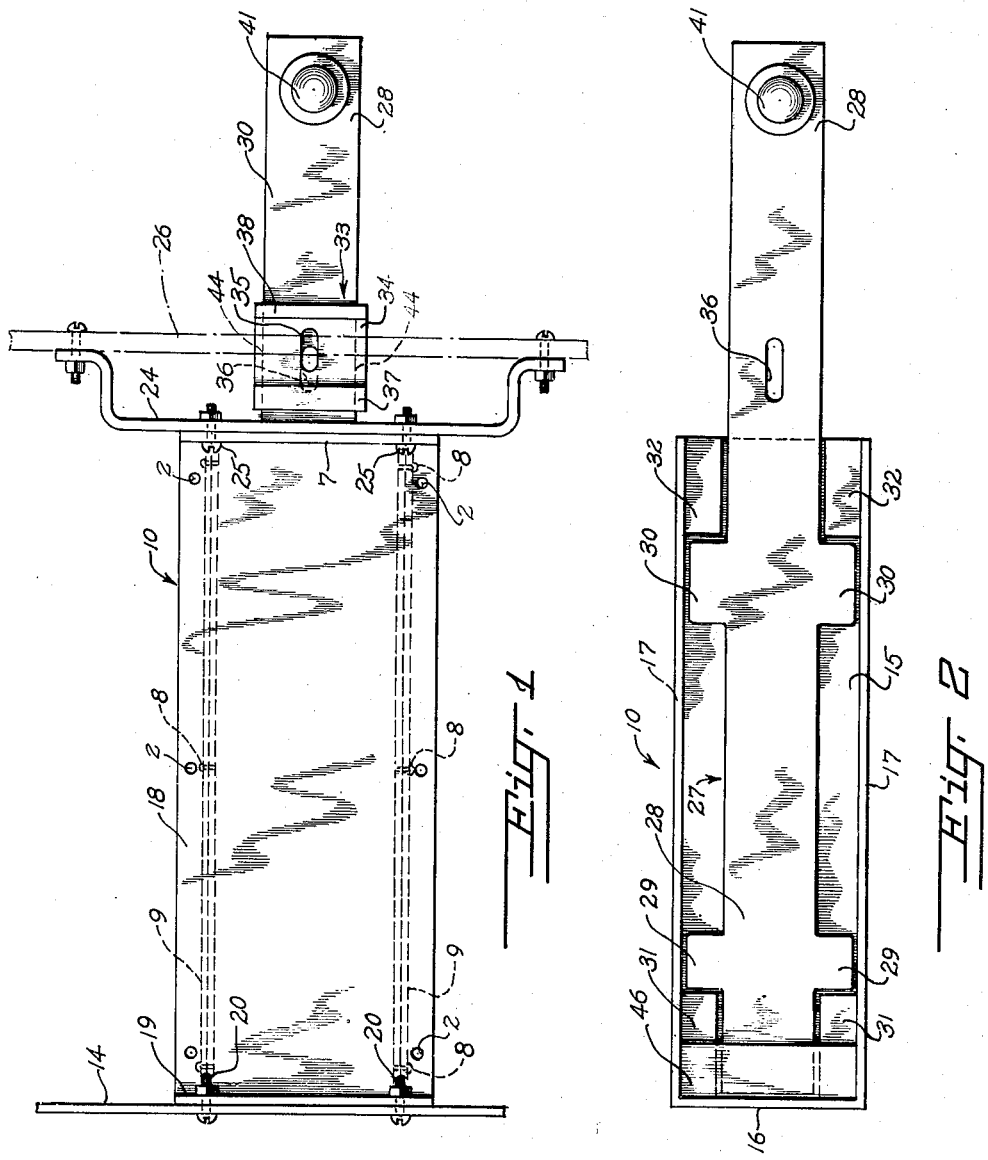
INVENTOR
Silas B. Van Zee
BY Royh Daily
ATTORNEY

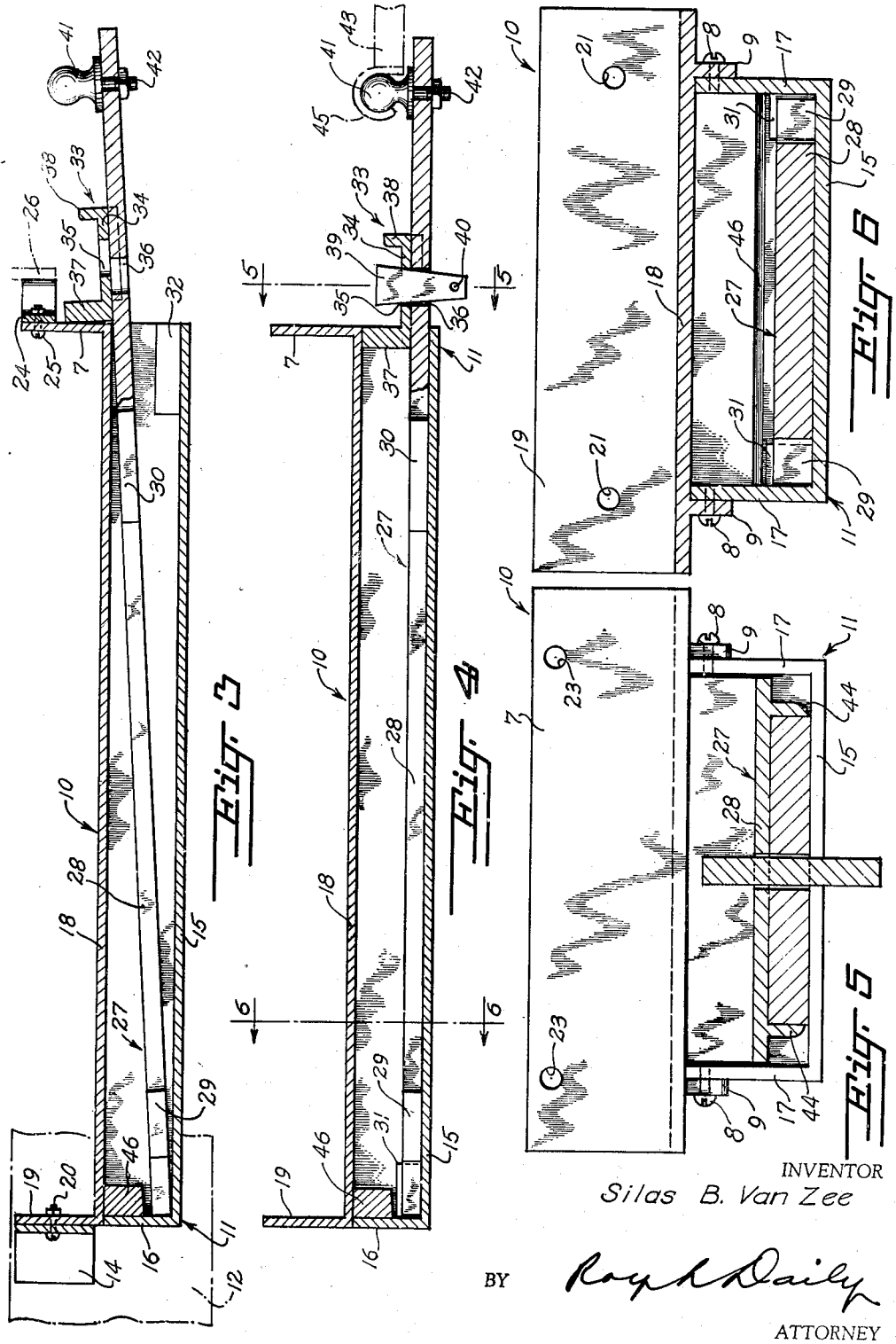

Patented Aug. 3, 1954

2,685,457

UNITED STATES PATENT OFFICE 2,685,457

TRAILER HITCH

Silas B. Van Zee, Anderson, Calif.

Application May 21, 1952, Serial No. 289,182

2 Claims. (Cl. 280—491)

This invention relates to a coupler, and more particularly to a coupler for detachably connecting a pair of vehicles together.

The object of the invention is to provide a coupler which is adapted to be used for attaching a towing vehicle, such as an automobile, to a vehicle being towed, such as a trailer, the coupler of the present invention being constructed so that the vehicle being towed can be readily disconnected from or connected to the towing vehicle as desired.

Another object of the invention is to provide a removable trailer hitch which is attractively designed and which includes a tongue that can be readily removed when a vehicle is not being towed so as to prevent the ball which is arranged on the tongue from becoming accidentally hooked on bumpers of other vehicles, as when the vehicle is being parked or otherwise used.

Still another object of the invention is to provide a removable trailer hitch which includes a locking mechanism for insuring that the hitch will not become accidentally unlocked when being used, the tailer hitch of the preesnt invention including a housing or frame that is permanently attached to the towing vehicle, the trailer hitch of the present invention enabling the towed trailer to be safely pulled forwardly or pushed backwardly.

A still further object of the invention is to provide a trailer hitch which includes a tongue that can be removed when the trailer is not being towed so as to reduce traffic hazards, the trailer hitch of the present invention being dirt free and which will not detract from the appearance of the vehicle.

A further object of the invention is to provide a trailer hitch which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a top plan view of the trailer hitch, constructed according to the present invention.

Figure 2 is a sectional view taken on the line 2—2 of Figure 4.

Figure 3 is a longitudinal vertical sectional view taken through the trailer hitch of the present invention.

Figure 4 is a view similar to Figure 3, but showing the position of the parts when the hitch is in its locked position.

Figure 5 is a sectional view taken on the line 5—5 of Figure 4.

Figure 6 is a sectional view taken on the line 6—6 of Figure 4.

Referring in detail to the drawings, the numeral 10 designates a trailer hitch which is adapted to be used for coupling together a pair of vehicles, such as an automobile or other towing vehicle, and a trailer. The trailer hitch 10 of the present invention may be fabricated of any suitable material and includes a hollow housing or frame 11 which has its rear end open, Figure 3, for a purpose to be later described. The housing 11 is adapted to be secured to longitudinal channels 12 (broken lines Figure 3), and the longitudinal channels may be secured beneath the automobile or other towing vehicle. A bar 14 may extend transversely between the longitudinal channels 12 and the bar 14 can be secured to the channels 12 in any suitable manner, as for example by welding.

The housing 11 includes a horizontally disposed bottom wall 15, an end wall 16, and spaced parallel vertically disposed side walls 17, Figures 3 and 6. There is further provided a top plate or cover member 18 which extends longitudinally across the top of the housing 11. Extending upwardly from the top plate 18 and secured thereto or formed integral therewith is a pair of vertically disposed ears 19 and 7. The ear 19 is provided with a plurality of openings 21, Figure 6, and suitable securing elements such as bolt or nut assemblies 20 extend through the openings 21 and through registering openings in the bar 14 for securing the top plate 18 to the bar 14. The other ear 7 is provided with a plurality of openings 23 which register with openings in a stiffener bar 24, and the stiffener bar 24 is secured to the vehicle bumper 26 (broken lines Figure 3). Suitable securing elements such as bolt and nut assemblies 25 extend through the registering openings in the ear 7 and stiffener bar 24 for maintaining the rear end of the top plate 18 secured in place.

The removable trailer hitch of the present invention further includes a tongue 27 which embodies an elongated shank 28. Extending from the shank 28 adjacent one end thereof is a pair of opposed lugs 29, and there is also provided a second pair of opposed lugs 30 which extend from a different portion of the shank 28. Arranged in the housing 11 and secured therein is a pair of opposed thrust blocks 31 for coaction with the lugs 29. A second pair of spaced opposed thrust blocks 32 is arranged in the housing 11 and secured to the bottom wall 15 for coaction with the lugs 30 as hereinafter described.

A means is provided for locking the tongue 27 in the position shown in Figure 4, so that the tongue will not become accidentally disengaged. This means comprises a locking mechanism which embodies a sliding body member 33. The body member 33 is slidably mounted on the tongue 27 and includes a bottom portion 34 which is provided with a slot 35 that is mounted for movement into and out of registry with a slot 36 that is arranged in the tongue 27. A wedge 39 is adapted to be positioned or extended through the registering slots 35 and 36, as shown in Figure 4, so as to maintain the body member 33 immobile in its adjusted position. The body member 33 is further provided with a vertical section 38 which can be used as a hand grip to facilitate the adjustment of the body member 33, and arranged in spaced parallel relation with respect to the vertical section 38 is a vertical section 37 which is adapted to be interposed between the upper surface of the tongue 27 and the lower surface of the top plate 18. The wedge 39 may be provided with an opening 40 through which a chain, cable, or other securing means can be attached so as to prevent accidental loss of the wedge 39.

Arranged on the rear end of the tongue 27 is a ball member 41 which may be attached to the tongue 27 by a bolt and nut assembly 42. The ball member 41 is adapted to engage the usual socket 45 which may be arranged on the front end of the trailer 43 (broken lines Figure 4).

For guiding the sliding body member 33 during its adjustment, a pair of side members 44 extend from the section 34 and are secured thereto or formed integral therewith, the side members 44 being arranged on opposite sides of the tongue 27. A means is provided for securing the top plate 18 to the housing 11, and this means comprises a pair of vertically disposed spaced parallel flanges 9 which are provided with a plurality of openings that register with openings in the side walls 17 of the housing 11. Suitable securing elements 8 extend through the registering openings in the flanges 9 and side walls 17 for securing the top plate 18 to the housing 11, Figure 6. A heel block 46 is arranged within the housing 11 and secured to the end wall 16 for coaction with the adjacent end of the tongue 27 to help hold the tongue 27 in its locked position.

In use, the top plate 18 is extended between the bars 14 and 24 and secured thereto, the bar 14 extending between the longitudinal channel members 12, while the bar 24 is connected to the vehicle rear bumper 26. The top plate 18 is secured to the housing 11 by means of the bolts or screws 8 which extend through the flanges 9 and into the side walls 17 so that the housing 11 and top plate 18 both remain permanently secured together and both remain permanently under the towing vehicle, such as an automobile. When a trailer is not being towed, the wedge 39 is removed, and then the body member 33 is moved outwardly of the housing 11 through the open end thereof, so that the tongue 27 can be completely removed from the housing 11. When a trailer is to be towed, the tongue 27 is first inserted into the housing 11 through the open end thereof. Then the body member 33 of the locking mechanism is moved to the position shown in Figure 4 so that the slots 35 and 36 register, whereupon the wedge 39 is projected through these registering slots so as to prevent accidental shifting of the body member 33. It will be seen that when the body member 33 is in its locked position, as shown in Figure 4, the vertical section 37 of the body member is interposed snugly between the walls 15 and 18 to prevent the tongue 27 from accidentally lifting up or out of the housing. The ball member 41 is adapted to be received in the socket 45 of the trailer 43 so that the trailer can be readily pulled forwardly or pushed backwardly. With the parts in the locked position shown in Figure 4, the trailer will be effectively towed due to the fact that the lugs 30 are arranged in abutting relation with respect to the thrust blocks 32. The other pair of lugs 29 are utilized when the trailer is being pushed backwards since when the trailer is being pushed backwards the thrust blocks 31 will exert a backward thrust on the lugs 29.

In Figure 3 the parts are shown in the position which they assume when the tongue is being inserted or removed from the housing 11. The heel block 46 restricts the movement of the rear of the tongue, and the coacting blocks 31 and lugs 29 provide full strength for backing up the trailer. From the foregoing, it is apparent that a coupler has been provided which is especially useful for attaching a trailer to a towing vehicle. The housing or frame remains permanently under the towing vehicle and the drawbar or tongue 27 is easily removable from the housing. The assembly of the present invention will enhance the appearance of the towing vehicle, and will not become accidentally disengaged due to the provision of the locking mechanism. Also, the coupler of the present invention has full strength in either forward or reverse motion. The lugs on the opposite sides of the tongue 27 also take up side clearance between the tongue and side walls of the housing. The tongue can be removed when a trailer is not being towed so that traffic hazards will be eliminated, and also the complete unit is dirt free when not being used. A cotter key or other object can be inserted in opening 40 to keep the wedge in place, and the openings 2 permit the frame to be bolted to the auto frame.

I claim:

1. In a removable trailer hitch, a hollow housing adapted to be attached to a towing vehicle and including a bottom wall, spaced parallel side walls, one end of said housing being open, a top plate mounted on said housing and including spaced parallel vertically disposed apertured flanges secured to the side walls of said housing, vertically disposed apertured ears extending from said top plate for attachment to the towing vehicle, a tongue removably positioned in said housing and including an elongated shank, a first pair of opposed thrust blocks secured within said housing, a second pair of opposed thrust blocks secured within said housing, opposed lugs extending from said shank for coaction with said thrust blocks, a locking mechanism embodying a body member slidably arranged on said tongue, said tongue and body member being provided with slots, the slots in said body member adapted to register with the slot in said tongue when the tongue is flush with the bottom of the housing, a wedge extending through the slots when the slots are in registry, and a ball member mounted on the rear end of said tongue for engagement with a trailer.

2. In a removable trailer hitch, a hollow housing adapted to be attached to a towing vehicle and including a bottom wall, spaced parallel side walls, one end of said housing being open, a top plate mounted on said housing and including spaced parallel vertically disposed apertured flanges secured to the side walls of said housing, vertically disposed apertured ears extending from said top plate for attachment to the towing vehicle, a tongue removably positioned in said housing and including an elongated shank, a first pair of opposed thrust blocks secured within said housing, a second pair of opposed thrust blocks secured within said housing, opposed lugs extending from said shank for coaction with said thrust blocks, a locking mechanism embodying a body member slidably arranged on said tongue, said tongue and body member being provided with slots, the slots in said body member adapted to register with the slot in said tongue when the tongue is flush with the bottom of the housing, a wedge extending through the slots when the slots are in registry, and a ball member mounted on the rear end of said tongue for engagement with a trailer, and a heel block mounted in said housing and spaced above said bottom wall.

References Cited in the file of this patent

UNITED STATES PATENTS

| Number | Name | Date |
|---|---|---|
| 2,425,838 | Schultz | Aug. 19, 1947 |
| 2,447,737 | Christensen | Aug. 24, 1948 |
| 2,474,231 | Crosley | June 28, 1949 |
| 2,512,836 | Olson et al. | June 27, 1950 |
| 2,544,185 | Sargent | Mar. 6, 1951 |
| 2,554,711 | Lowman | May 29, 1951 |
| 2,569,086 | Zenk | Sept. 25, 1951 |
| 2,570,933 | Fobes et al. | Oct. 9, 1951 |